United States Patent
Chu

(10) Patent No.: US 7,099,981 B2
(45) Date of Patent: Aug. 29, 2006

(54) MULTIPLE MODULE COMPUTER SYSTEM AND METHOD

(75) Inventor: William W. Y. Chu, Los Altos, CA (US)

(73) Assignee: ACQIS Technology, Inc., Mountain View, CA (US)

( * ) Notice: Subject to any disclaimer, the term of this patent is extended or adjusted under 35 U.S.C. 154(b) by 304 days.

(21) Appl. No.: 10/772,214

(22) Filed: Feb. 3, 2004

(65) Prior Publication Data

US 2004/0177200 A1    Sep. 9, 2004

Related U.S. Application Data

(63) Continuation of application No. 09/569,758, filed on May 12, 2000, now Pat. No. 6,718,415.

(60) Provisional application No. 60/134,122, filed on May 14, 1999.

(51) Int. Cl.
G06F 1/00 (2006.01)

(52) U.S. Cl. .................. 710/301; 710/313; 710/315; 710/63; 710/72; 709/227; 709/248

(58) Field of Classification Search ........ 710/305–315, 710/300–304, 62–64, 72–73; 709/214, 217, 709/219, 226, 227
See application file for complete search history.

(56) References Cited

U.S. PATENT DOCUMENTS

| 4,769,764 A | 9/1988 | Levanon |
| 4,872,091 A | 10/1989 | Maniwa et al. |
| 4,918,572 A | 4/1990 | Tarver et al. |
| 5,251,097 A | 10/1993 | Simmons et al. |
| 5,311,397 A | 5/1994 | Harshberger et al. |
| 5,317,477 A | 5/1994 | Gillett |
| 5,331,509 A | 7/1994 | Kikinis |
| 5,428,806 A | 6/1995 | Pocrass |
| 5,436,857 A | 7/1995 | Nelson et al. |
| 5,463,742 A | 10/1995 | Kobayashi |
| 5,539,616 A | 7/1996 | Kikinis |
| 5,550,710 A | 8/1996 | Rahamim et al. |
| 5,550,861 A | 8/1996 | Chan et al. |

(Continued)

FOREIGN PATENT DOCUMENTS

EP    722138 A1    7/1996

(Continued)

OTHER PUBLICATIONS

Eversys Corp., "Eversys System 8000 Consolidated Network Server Market and Product Overview," Slide Presentation, downloaded from <<http://eversys.com>>, 20 pages total.

(Continued)

Primary Examiner—Mark H. Rinehart
Assistant Examiner—Raymond N Phan
(74) Attorney, Agent, or Firm—Townsend and Townsend and Crew LLP

(57) ABSTRACT

A computer system for multi-processing purposes. The computer system has a console comprising a first coupling site and a second coupling site. Each coupling site comprises a connector. The console is an enclosure that is capable of housing each coupling site. The system also has a plurality of computer modules, where each of the computer modules is coupled to a connector. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

91 Claims, 4 Drawing Sheets

U.S. PATENT DOCUMENTS

| | | | |
|---|---|---|---|
| 5,600,800 | A | 2/1997 | Kikinis et al. |
| 5,603,044 | A | 2/1997 | Annapareddy et al. |
| 5,608,608 | A | 3/1997 | Flint et al. |
| 5,640,302 | A | 6/1997 | Kikinis |
| 5,680,126 | A | 10/1997 | Kikinis |
| 5,745,733 | A | 4/1998 | Robinson |
| 5,819,050 | A | 10/1998 | Boehling et al. |
| 5,948,047 | A | 9/1999 | Jenkins et al. |
| 5,971,804 | A | 10/1999 | Gallagher et al. |
| 5,991,163 | A | 11/1999 | Marconi et al. |
| 5,999,952 | A | 12/1999 | Jenkins et al. |
| 6,016,252 | A | 1/2000 | Pignolet et al. |
| 6,029,183 | A | 2/2000 | Jenkins et al. |
| 6,088,224 | A | 7/2000 | Gallagher et al. |
| 6,157,534 | A | 12/2000 | Gallagher et al. |
| 6,163,464 | A | 12/2000 | Ishibashi et al. |
| 6,175,490 | B1 | 1/2001 | Papa et al. |
| 6,208,522 | B1 | 3/2001 | Manweiler et al. |
| 6,216,185 | B1 | 4/2001 | Chu |
| 6,260,155 | B1 | 7/2001 | Dellacona |
| 6,289,376 | B1 | 9/2001 | Taylor et al. |
| 6,311,268 | B1 | 10/2001 | Chu |
| 6,314,522 | B1 | 11/2001 | Chu et al. |
| 6,317,329 | B1 | 11/2001 | Dowdy et al. |
| 6,321,335 | B1 | 11/2001 | Chu |
| 6,345,330 | B1 | 2/2002 | Chu |
| 6,452,789 | B1 | 9/2002 | Pallotti et al. |
| 6,564,274 | B1 | 5/2003 | Heath et al. |
| 6,718,415 | B1 * | 4/2004 | Chu .......................... 710/301 |
| 6,725,317 | B1 | 4/2004 | Bouchier et al. |

FOREIGN PATENT DOCUMENTS

| | | |
|---|---|---|
| JP | 6-289953 | 10/1994 |
| WO | WO 92/18924 | 10/1992 |
| WO | WO 94/0097 | 1/1994 |
| WO | WO 95/13640 | 5/1995 |

OTHER PUBLICATIONS

"SQL Server and NT Cluster Manager Availability Demo," Microsoft Server Programmer Developers Conference, Nov. 1996, 15 pages total.

Microsoft Cluster Service Center, "MSCS Basics," downloaded from <<http://www.nwnetworks.com/mscsbasics.htm>>, Feb. 7, 2005, 6 pages total.

Agerwala, T., Systems Journal "SP2 System Architecture" vol. 34, No. 2, 1995 Scalable Parallel Computing vol. 34, No. 2, 1995.

CETIA Brochure "CETIA Powerengine CVME 603e" pp. 1-6 downloaded from the internet at. http://www.cetia.com/ProductAddOns/wp-47-01.pdf on Feb. 15, 2006.

MPL Brochure "1st Rugged All in One Industrial 486FDX-133 MHz PC" pp. 1-2, downloaded from the internet at. http://www.mpl.ch/DOCs/ds48600.pdf on Feb. 15, 2006.

MPL Brochure "IPM 486 Brochure/IPM5 User Manual" pp. 1-9 downloaded from the internet at http://www.mpl.ch/DOCs/u48600xd.pdf on Feb. 15, 2006.

Snyder, Joel "Better Management through consolidation" pp. 1-6 downloaded from the internet at http://www.opus1.com/www.jms/nw-con-0818rev.html.

Bernal, Carlos, product brochure entitled: "PowerSMP Series 4000", (Mar. 1998) <<http://www/winnetmag,com/Windows/Article/ArticleID/3095//3095.html, downloaded from web on Jun. 22, 2004, 2 pgs.

Cragle, Jonathan, "Density System 1100", May 1999) <<http://www.winnetmag.com/Windows/Article/ArticleID/5199/5199.html>>, downloaded from web on Jun. 21, 2004, 4 pgs.

Feldman, Jonathan, "Rack Steady: The Four Rack-Mounted Servers That Rocked Our Network", <<http://www.networkcomputing.com/shared/printArticle.jhtml?article=/910/910r3side1.htm...>>Jun. 23, 2004, 3 pg.

Fetters, Dave, "Cubix High-Density Server Leads the Way With Standout Management Software", (Feb. 8, 1999) <<http://www.nwc.com/shared/printArticle.jhtml?article=/1003/1003r3full.html&pub=nwc>>, downloaded from web on Jun. 23, 2004, 5 pgs.

Gardner, Michael and Null, Christopher, "A Server Condominium", <<http://www.lantimes.com/testing/98jun/806a042a.html>>, Jun. 23, 2004, 3 pgs.

Harrison, Dave, "VME in the Military: The M1A2 Main Battle Tank Upgrade Relies on COTS VME" <<http://www.dy4.com>>, (Feb. 9, 1998) pp. 1-34.

Williams, Dennis, "Consolidated Servers", (Feb. 17, 1997) <<http://www.lantimes.com/testing/97compare/pcconsol.html>> downloaded from web on Jun. 23, 2004, 2 pgs.

Williams, Dennis, "Executive Summary: Consolidate Now", (Feb. 17, 1997) <<http://www.lantimes.com/testing/97feb/702b064a.html>> downloaded from web on Jun. 23, 2004, 2 pgs.

Williams, Dennis, "Top Scores for Useability and Openness", (Feb. 17, 1997) <<http://www.lantimes.com/testing/97feb/702b064a.html>> downloaded from web on Jun. 23, 2004, 2 pgs.

Williams, Dennis, "ChatCom Inc. Chatterbox", (Feb. 17, 1997) <<http://www.lantimes.com/testing/97feb/702b066a.html>> downloaded from web on Jun. 23, 2004, 3 pgs.

Williams, Dennis, "EVERSYS Corp. System 8000", (Feb. 17, 1997) <<http://www.lantimes.com/testing/97feb/702b070b.html>> downloaded from web on Jun. 22, 2004, 4 pgs.

Williams, Dennis, "Cubix Corp. ERS/FT II", (Feb. 17, 1997) <<http://www.lantimes.com/testing/97feb/702b068b.html>> downloaded from web on Jun. 23, 2004, 4 pgs.

Crystal Advertisement for "Rackmount Computers", (© 2000-2004) <<http://www.crystalpc.com/products/roservers.asp>>, downloaded from web on Jun. 17, 2004, 8 pgs.

Crystal Advertisement for "QuickConnect® Cable Management", (© 2000-2004) <<http://www.crystalpc.com/products/quickconnect.asp>> downloaded from web on Jun. 17, 2004, 4 pgs.

Cubix Product Brochure entitled, "Density System", (© 2000) <<http://64.173.211.7/support/techinfo/system/density/density10.htm>> downloaded from web on Jun. 22, 2004, 3 pgs.

Cubix Product Brochure entitled, "Density System, Technical Specifications", (© 2000) <<http://64.173.211.7/support/techinfo/system/density/info/spec.htm>> downloaded from web on Jun. 22, 2004, 2 pgs.

Cubix Product Manual entitled, "Density System", Chater 1—Introduction, (© 2000) <<http://64.173.211.7/support/techinfo/manuals/density/Chap-1..htm>> downloaded from web on Jun. 22, 2004, 5 pgs.

Cubix, "Click on the front panel that matches your system", (© 2000) <<http://64.173.211.7/support/techinfo/system/density/density.htm>>, downloaded from web on Jun. 22, 2004, 1 pg.

Cubix Product Manual entitled, "Density System", Chapter 2—Installation, (© 2000) <<http://64.173.211.7/support/techinfo/manuals/density/Chap-2.htm>> downloaded from web on Jun. 22, 2004, 9 pgs.

Cubix Product Manual entitled, "Density System", Chapter 3—Operation, (© 2000) <<http://64.173.211.7/support/techinfo/manuals/density/Chap-3.htm>> downloaded from web on Jun. 22, 2004, 4 pgs.

Cubix Product Manual entitled, "Density System", Chapter 4—Maintenance and Repair, (© 2000) <<http://64.173.211.7/support/techinfo/manuals/density/Chap-4.htm>> downloaded from web on Jun. 22, 2004, 5 pgs.

Cubix, "What are Groups?", (© 2000) <<http://64.173.211.7/support/techinfo/system/density/info/groups.htm>>, downloaded from web on Jun. 22, 2004, 3 pgs.

Cubix, "SP 5200XS Series Plug-in Computers", (© 2000) <<http://64.173.211.7/support/techinfo/bc/sp5200xs/intro.htm>>, downloaded from web on Jun. 22, 2004, 2 pgs.

Cubix, "SP 5200XS Series Technical Specifications", (© 2000) <<http://64.173.211.7/support/techinfo/bc/sp5200xs/spec.htm>>, downloaded from web on Jun. 22, 2004, 2 pg.

Cubix, "SP 5200 Series" Chapter 1—Introduction, (© 2000) <<http://64.173.211.7/support/techinfo/manuals/sp5200/chap-1.htm>>, downloaded from web on Jun. 22, 2004, 3 pgs.

Cubix, "SP 5200 Series" Chapter 2—Switches & Jumpers, (© 2000) <<http://64.173.211.7/support/techinfo/manuals/sp5200/chap-2.htm>>, downloaded from web on Jun. 22, 2004, 3 pgs.

Cubix, "SP 5200 Series" Chapter 3—Installation, (© 2000) <<http://64.173.211.7/support/techinfo/manuals/sp5200/chap-3.htm>>, downloaded from web on Jun. 22, 2004, 4 pgs.

Cubix, "SP 5200 Series" Chapter 4—Technical Reference, (© 2000) <<http://64.173.211.7/support/techinfo/manuals/sp5200/chap-4.htm>>, downloaded from web on Jun. 22, 2004, 3 pgs.

Cubix, "DP 6200 'D' Series Plug-in Computers" <<http://64.173.211.7/support/techinfo/bc/dp/6200d/intro.htm>>, downloaded from web on Jun. 22, 2004, 3 pgs.

Cubix, "Installing DP or SP Series Boards" (© 2000) <<http://64.173.211.7/support/techinfo/bc/dp/6200d/intro.htm>>, downloaded from web on Jun. 22, 2004, 2 pgs.

Cubix, "Powering On/Off or Resetting Plug-in Computers in an Density System", (© 2000) <<http://64.173.211.7/support/techinfo/system/density/info/power.htm>>, downloaded from web on Jun. 22, 2004, 2 pgs.

Cubix, "Multiplexing Video, Keyboard & Mouse with Multiple Density Systems", (© 2000) <<http://64.173.211.7/support/techinfo/system/density/info/vkm-mux.htm>>, downloaded from web on Jun. 22, 2004, 2 pgs.

eBay Advertisement for "Total IT Group Network Engines", <<http://cgi.ebay.com/we/eBayISAPI.dll?ViewItem&Item=5706388046&sspagename+STRK%3AMDBI%3AMEBI3AIT&rd=1>>, downloaded from web on Jun. 25, 2004, 1 pgs.

"Features Chart", (Feb. 1, 1997) <<http://www.lantimes.com/testing/97feb/702b072a.html>>, downloaded from web on Jun. 23, 2004, 3 pg.

Internet Telephone Roundup, "Industrial Computers", <<http://www.tmcnet.com/artilces/itmag/0499/0499roundup.htm>>, downloaded from web on Jun. 23, 2004, 5 pgs.

Press Release: Hiawatha, Iowa, (Mar. 1, 1997) entitled "Crystal Group Products Offer Industrial PCs with Built-in Flexibility", <<http://www.crystalpc.com/news/pressreleases/prodpr.asp>>, downloaded from web on May 14, 2004, 2 pgs.

Press Release: Kanata, Ontario, Canada, (Apr. 1998) entitled "Enhanced COTS SBC from DY 4 Systems features 166MHz Pentium™ Processor" <<http://www.realtime-info.be/VPR/layout/display/pr.asp?/pr.asp?PRID=363>>, 2 pgs.

Product Brochure entitled "SVME/DM-192 Pentium® II Single Board Computer" (Jun. 1999) pp. 1-9.

Product Brochure entitled "System 8000", <<http://www.bomara.com/Eversys/briefDefault.htm>>, downloaded from web on Jun. 22, 2004, 4 pgs.

Product Brochure entitled: "ERS/FT II System", (© 2000) <<http://64.173.211.7/support/techinfo/system/ersft2/ersft2.htm>>, downloaded from web on Jun. 22, 2004, 4 pgs.

Product Manual entitled: "ERS II and ERS/FT II", Chap. 3, System Components, <<http://64.173.211.7/support/techinfo/manuals/ers2/ers2-c3.htm>>, downloaded from web on Jun. 22, 2004, 21 pgs.

Product Manual entitled: "ERS II and ERS/FT II", Chap. 6, Component Installation, <<http://64.173.211.7/support/techinfo/manuals/ers2/ers2-c6.htm>>, downloaded from web on Jun. 22, 2004, 18 pgs.

Windows Magazine, "Cubix PowerSMP Series 4000", Nov. 1997, <http://<www.techweb.com/winmag/library/1997/1101/ntent008.htm>> downloaded from the web on Jun. 22, 2004, p. NT07.

* cited by examiner

MULTIPLE MODULE COMPUTER SYSTEM AND METHOD

CROSS REFERENCE TO RELATED APPLICATIONS

The present application claims priority to U.S. Provisional Application No. 60/134,122 filed May 14, 1999, and also claims priority as a continuation application from U.S. Nonprovisional application Ser. No. 09/569,758, filed May 12, 2000, commonly assigned, and hereby incorporated by reference.

BACKGROUND OF THE INVENTION

The present invention relates to computing devices. More particularly, the present invention provides a system including a plurality of computer modules that can independently operate to provide backup capability, dual processing, and the like. Merely by way of example, the present invention is applied to a modular computing environment for desk top computers, but it will be recognized that the invention has a much wider range of applicability. It can be applied to a server as well as other portable or modular computing applications.

Many desktop or personal computers, which are commonly termed PCs, have been around and used for over ten years. The PCs often come with state-of-art microprocessors such as the Intel Pentium™ microprocessor chips. They also include a hard or fixed disk drive such as memory in the giga-bit range. Additionally, the PCs often include a random access memory integrated circuit device such as a dynamic random access memory device, which is commonly termed DRAM. The DRAM devices now provide up to millions of memory cells (i.e., mega-bit) on a single slice of silicon. PCs also include a high resolution display such as cathode ray tubes or CRTs. In most cases, the CRTs are at least 15 inches or 17 inches or 20 inches in diameter. High resolution flat panel displays are also used with PCs.

Many external or peripheral devices can be used with the PCs. Among others, these peripheral devices include mass storage devices such as a Zip™ Drive product sold by Iomega Corporation of Utah. Other storage devices include external hard drives, tape drives, and others. Additional devices include communication devices such as a modem, which can be used to link the PC to a wide area network of computers such as the Internet. Furthermore, the PC can include output devices such as a printer and other output means. Moreover, the PC can include special audio output devices such as speakers the like.

PCs also have easy to use keyboards, mouse input devices, and the like. The keyboard is generally configured similar to a typewriter format. The keyboard also has the length and width for easily inputting information by way of keys to the computer. The mouse also has a sufficient size and shape to easily move a curser on the display from one location to another location.

Other types of computing devices include portable computing devices such as "laptop" computers and the like. Although somewhat successful, laptop computers have many limitations. These computing devices have poor display technology. In fact, these devices often have a smaller flat panel display that has poor viewing characteristics. Additionally, these devices also have poor input devices such as smaller keyboards and the like. Furthermore, these devices have limited common platforms to transfer information to and from these devices and other devices such as PCs.

Up to now, there has been little common ground between these platforms including the PCs and laptops in terms of upgrading, ease-of-use, cost, performance, and the like. Many differences between these platforms, probably somewhat intentional, has benefited computer manufacturers at the cost of consumers. A drawback to having two separate computers is that the user must often purchase both the desktop and laptop to have "total" computing power, where the desktop serves as a "regular" computer and the laptop serves as a "portable" computer. Purchasing both computers is often costly and runs "thousands" of dollars. The user also wastes a significant amount of time transferring software and data between the two types of computers. For example, the user must often couple the portable computer to a local area network (i.e., LAN), to a serial port with a modem and then manually transfer over files and data between the desktop and the portable computer. Alternatively, the user often must use floppy disks to "zip" up files and programs that exceed the storage capacity of conventional floppy disks, and transfer the floppy disk data manually.

Another drawback with the current model of separate portable and desktop computer is that the user has to spend money to buy components and peripherals the are duplicated in at least one of these computers. For example, both the desktop and portable computers typically include hard disk drives, floppy drives, CD-ROMs, computer memory, host processors, graphics accelerators, and the like. Because program software and supporting programs generally must be installed upon both hard drives in order for the user to operate programs on the road and in the office, hard disk space is often wasted.

One approach to reduce some of these drawbacks has been the use of a docking station with a portable computer. Here, the user has the portable computer for "on the road" use and a docking station that houses the portable computer for office use.

Similar to separate desktop and portable computers, there is no commonality between two desktop computers. To date, most personal computers are constructed with a single motherboard that provides connection for CPU and other components in the computer. Dual CPU systems have been available through Intel's slot 1 architecture. For example, two Pentium II cartridges can be plugged into two "slot 1" card slots on a motherboard to form a Dual-processor system. The two CPU's share a common host bus that connects to the rest of the system, e.g. main memory, hard disk drive, graphics subsystem, and others. Dual CPU systems have the advantage of increased CPU performance for the whole system. Adding a CPU cartridge requires no change in operating systems and application software. However, dual CPU systems may suffer limited performance improvement if memory or disk drive bandwidth becomes the limiting factor. Also, dual CPU systems have to time-share the processing unit in running multiple applications. CPU performance improvement efficiency also depends on software coding structure. Dual CPU systems provide no hardware redundancy to help fault tolerance. In running multiple applications, memory and disk drive data throughput will become the limiting factor in improving performance with multi-processor systems.

Thus, what is needed are computer systems that can have multiple computer modules. Each computer module has dedicated memory and disk drive, and can operate independently.

SUMMARY OF THE INVENTION

According to the present invention, a technique including a method and device for multi-module computing is provided. In an exemplary embodiment, the present invention provides a system including a plurality of computer modules that can independently operate to provide backup capability, dual processing, and the like.

In a specific embodiment, the present invention provides a computer system for multi-processing purposes. The computer system has a console comprising a first coupling site and a second coupling site, e.g., computer module bay. Each coupling site comprises a connector. The console is an enclosure that is capable of housing each coupling site. The system also has a plurality of computer modules, where each of the computer modules is coupled to one of the connectors. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

In an alternative specific embodiment, the present invention provides a multi-processing computer system. The system has a console comprising a first coupling site and a second coupling site. Each coupling site comprises a connector. The console is an enclosure that is capable of housing each coupling site. The system also has a plurality of computer modules, where each of the computer modules is coupled to one of the connectors. Each of the computer modules has a processing unit, a main memory coupled to the processing unit, a graphics controller coupled to the processing unit, a mass storage device coupled to the processing unit, and a video output coupled to the processing unit. Each of the computer modules is substantially similar in design to each other to provide independent processing of each of the computer modules in the computer system. A video switch circuit is coupled to each of the computer modules through the video output. The video switch is configured to switch a video signal from any one of the computer modules to a display.

Numerous benefits are achieved using the present invention over previously existing techniques. In one embodiment, the invention provides improved processing and maintenance features. The invention can also provide increased CPU performance for the whole system. The invention also can be implemented without changes in operating system and application software. The present invention is also implemented using conventional technologies that can be provided in the present computer system in an easy and efficient manner.

In another embodiment, the invention provides at least two users to share the same modular desktop system. Each user operates on a different computer module. The other peripheral devices, i.e. CDROM, printer, DSL connection, etc. can be shared. This provides lower system cost, less desktop space and more efficiency. Depending upon the embodiment, one or more of these benefits can be available. These and other advantages or benefits are described throughout the present specification and are described more particularly below.

In still further embodiments, the present invention provides methods of using multiple computer modules.

These and other embodiments of the present invention, as well as its advantages and features, are described in more detail in conjunction with the text below and attached Figs.

DESCRIPTION OF SPECIFIC EMBODIMENTS

According to the present invention, a technique including a method and device for multi-module computing is provided. In an exemplary embodiment, the present invention provides a system including a plurality of computer modules that can independently operate to provide backup capability, dual processing, and the like.

Figure 1:
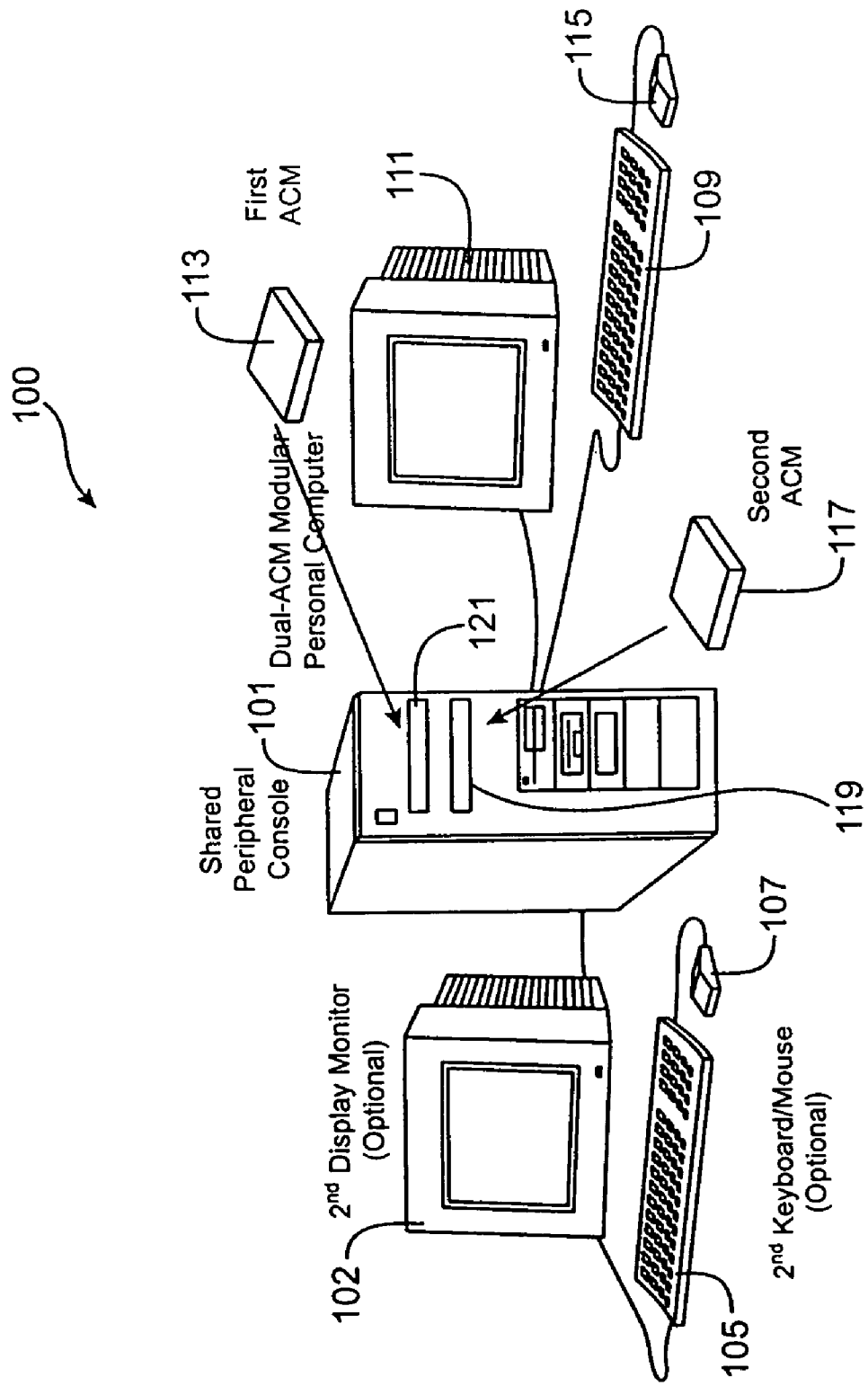
FIG. 1 is a simplified diagram of a computer system according to an embodiment of the present invention.

FIG. 1 is a simplified diagram of a computer system 100 according to an embodiment of the present invention. This diagram is merely an illustration and should not limit the scope of the claims herein. One of ordinary skill in the art would recognize other variations, modifications, and alternatives. The computer system 100 includes an attached computer module (i.e., ACM) 113, a desktop console 101, among other elements. The computer system also has another ACM module 117. Each ACM module has a respective slot 121, 119, which mechanically houses and electrically couples each ACM to the computer console. Also shown is a display 111, which connects to the console. Additionally, keyboard 109 and mouse 115 are also shown. A second display 102, keyboard 105, and mouse 107 can be coupled to the console in some optional embodiments to allow more than one user to operate the computer system. The computer system is modular and has a variety of components that are removable. Some of these components (or modules) can be used in different computers, workstations, computerized television sets, and portable or laptop units.

In the present embodiment, each ACM 113 includes computer components, as will be described below, including a central processing unit ("CPU"), IDE controller, hard disk drive, computer memory, and the like. The computer module bay (i.e., CMB) 121 is an opening or slot in the desktop console. The CMB houses the ACM and provides communication to and from the ACM. The CMB also provides mechanical protection and support to the ACM. The CMB has a mechanical alignment mechanism for mating a portion of the ACM to the console. The CMB further has thermal heat dissipation sinks, electrical connection mechanisms, and the like. Some details of the ACM can be found in co-pending Patent Application Nos. 09/149,882 and 09/149,548 filed Sep. 8, 1998, commonly assigned, and hereby incorporated by reference for all purposes.

In a specific embodiment, the present multiple computer module system has a peripheral console that has two or more computer bays that can receive a removable computer module or ACM. Multiple computer module system can function as a personal computer with only one ACM and the peripheral console. The second and additional ACM can be added later to increase overall system performance and reliability. The ACM operates independently as self-contained computer, communicates with each other through a high-speed serial communication and share most peripheral devices within the peripheral console. Each ACM controls its independent graphics subsystem and drives separate video output signals. A practical implementation is a dual ACM system. In a dual ACM system, two monitors can be used to display the two ACMs' graphics outputs at the same time. For a single monitor, a RGB switch is used to switch between the video outputs of the two ACMs and can be controlled by a command from the user. Similarly, input devices (i.e. keyboard and mouse) are switched between the two computer systems with a command from the user. Command from the user can be in the form of either a dedicated key on the keyboard or a special icon on the screen that the mouse can click on.

In most embodiments, the ACM includes an enclosure such as the one described with the following components, which should not be limiting:

1) A CPU with cache memory;
2) Core logic device or means;
3) Main memory;
4) A single primary Hard Disk Drive ("HDD") that has a security program;
5) Flash memory with system BIOS and programmable user password;
6) Operating System, application software, data files on primary HDD;
7) An interface device and connectors to peripheral console;
8) A software controllable mechanical lock, lock control means, and other accessories.

The ACM connects to a peripheral console with power supply, a display device, an input device, and other elements. Some details of these elements with the present system are described in more detail below. In a dual ACM system, the primary ACM can connect directly to the peripheral board in the peripheral console. The second ACM can connect either directly or indirectly to the peripheral board. For indirect connection, a receptacle board is added to allow a cable connection to the peripheral board. This is to facilitate the mechanical positioning of the second ACM inside the computer chassis. The receptacle board approach can even be used for the primary ACM if a high bandwidth peripheral bus, e.g. PCI Bus, is not connected from the primary ACM to the peripheral board.

The shared peripheral console has a chassis and a motherboard that connects the following devices:

1) Input means, e.g. keyboard and mouse,
2) Display means, e.g. RGB monitor,
3) Add-on means, e.g. PCI add-on slots,
4) Two Computer Module Bays (CMB) with connectors to two ACMs,
5) A serial communication Hub controller that interfaces to serial communication controller of both ACMs,
6) Shared storage subsystem, e.g. Floppy drive, CDROM drive, DVD drive, or 2nd Hard Drive,
7) Communication device, e.g. modem,
8) Power supply, and others.

The computer bay is an opening in the peripheral console that receives an ACM. CMB provides mechanical protection to ACM, mechanical alignment for connector mating, mechanical locking system to prevent theft and accidental removal, and connectors at the end of the opening for connecting to ACM. The interface bus between ACM and the peripheral console has a video bus, peripheral connections, serial communication connection, control signals and power connection. Video bus includes video output of graphics devices, i.e. analog RGB and control signals for monitor. Power connection supplies the power for ACM.

Figure 2:
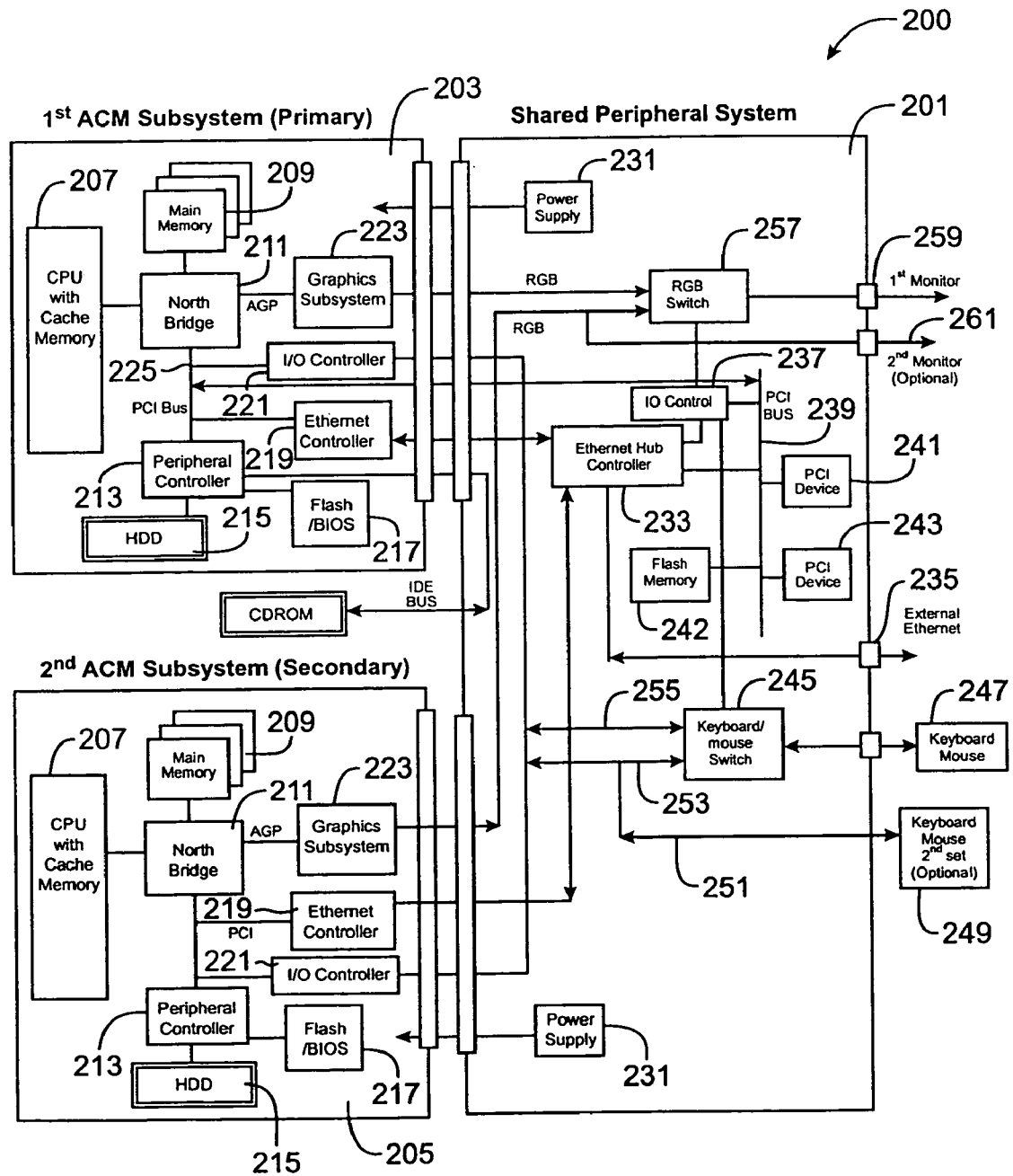
FIG. 2 is a simplified block diagram of a computer system according to an alternative embodiment of the present invention.

An implementation of peripheral sharing is the use of Ethernet controllers to bridge the communication between the two ACMs. Some of the peripheral devices residing in the peripheral console are shown in the simplified diagram of FIG. 2. As shown, the diagram is merely an illustration which should not limit the scope of the claims herein. One of ordinary skill in the art would recognize many other variations, alternatives, and modifications. As shown, a primary ACM 203 is connected to PCI peripheral devices in the peripheral console through the PCI bus 225 that passes through the connection between primary ACM 203 and peripheral console 201. As shown, ACM has a CPU module 207 coupled to the PCI bus through a North Bridge 211.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, peripheral controller 213 is coupled to BIOS/flash memory 217. Additionally, the peripheral controller is coupled to a clock control logic, a configuration signal, and a peripheral bus. The ACM has the hard drive module 215. Among other elements, the ACM includes north bridge 215, graphics subsystem 223 (e.g., graphics accelerator, graphics memory), an IDE controller, and other components. Adjacent to and in parallel alignment with the hard drive module 215 is the PCI bus. In a specific embodiment, North Bridge unit 211 often couples to a computer memory 209, to the graphics subsystem, and to the peripheral controller via the PCI bus. Graphics subsystem typically couples to a graphics memory, and other elements. IDE controller generally supports and provides timing signals necessary for the IDE bus. In the present embodiment, the IDE controller is embodied as part of a P114XE controller from Intel, for example. Other types of buses than IDE are contemplated, for example EIDE, SCSI, 1394, and the like in alternative embodiments of the present invention.

The hard drive module or mass storage unit 215 typically includes a computer operating system, application software program files, data files, and the like. In a specific embodiment, the computer operating system may be the Windows98 operating system from Microsoft Corporation of Redmond Washington. Other operating systems, such as Windows$^{NT}$, MacOS8, Unix, and the like are also contemplated in alternative embodiments of the present invention. Further, some typical application software programs can include Office98 by Microsoft Corporation, Corel Perfect Suite by Corel, and others. Hard disk module 215 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE. Among other features, the computer system includes an ACM with security protection.

The ACM also has a network controller, which can be an Ethernet controller 219, which is coupled to the North Bridge through the PCI bus. The North Bridge is coupled to the CPU. The Ethernet controller can be a 10/100 Base, such as Intel's 82559 or the like. Other types of network connection devices can also be used. For example, the invention can use Gbit Ethernet 1394, and USB 2.0. The network controller couples to a hub 233 in the console, which includes shared peripheral system 201.

Also shown is the second ACM 205. The second ACM has the same or similar components as the first ACM. Here, like reference numerals have been used for easy cross-referencing, but is not intended to be limiting. In some embodiments, the secondary ACM is not connected to the PCI bus in the peripheral console directly. The secondary ACM 219 accesses peripheral devices controlled by the primary ACM through the Ethernet connection to the primary ACM, e.g. CD-ROM, or PCI modem. The implementation is not restricted to Ethernet serial communication and can use other high-speed serial communication such as USB 2.0, and 1394. The Ethernet hub is coupled to an external output port 235, which connects to an external network.

The primary hard disk drive in each ACM can be accessed by the other ACM as sharable hard drive through the Ethernet connection. This allows the easy sharing of files between the two independent computer modules. The Ethernet Hub Controller provides the high-speed communication function between the two computer modules. Ethernet data bandwidth of 100 Mbit/sec allows fast data communication between the two computer modules. The secondary ACM access peripheral devices of the primary ACM through the network connection provided by Ethernet link. The operating system, e.g. Windows 98, provides the sharing of resources between the two ACMs. In some embodiments, critical data in one ACM can be backup into the other ACM.

The Ethernet hub also couples to PCI bus 239, which connects to PCI devices 241, 243, e.g., modem, SCSI controller. A flash memory 242 can also be coupled to the PCI bus. The flash memory can store passwords and security information, such as those implementations described in U.S. Ser. No. 09/183,493, which is commonly owned, and hereby incorporated by reference. The hub 233 also couples to an I/O control 237, which connects to keyboard/mouse switch 245, which couples to keyboard/mouse 247. Optionally, the keyboard/mouse switch also couples to a second keyboard/mouse 259 via PS2 or USB signal line 251. The keyboard/mouse switch has at least a first state and a second state, which allow operation of respectively multiple keyboards or a single keyboard. The switch also couples to each I/O controller 221 in each ACM via lines 253, 255. The I/O control 237 also couples to an RGB switch 257, which allows video signals to pass to the first monitor 259. Alternatively, the RGB switch couples to a second monitor 261. The RGB switch includes analog video switches such as MAXIM's MAX4545.

The peripheral system 201 also has an independent power supply 231 for each ACM. Each power supply provides power to each ACM. As merely an example, the power supply is a MICRO ATX 150W made by ENLIGHT, but can be others. The power supply is connected or coupled to each ACM through a separate line, for example. The independent power supply allows for independent operation of each ACM in some embodiments.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 3:
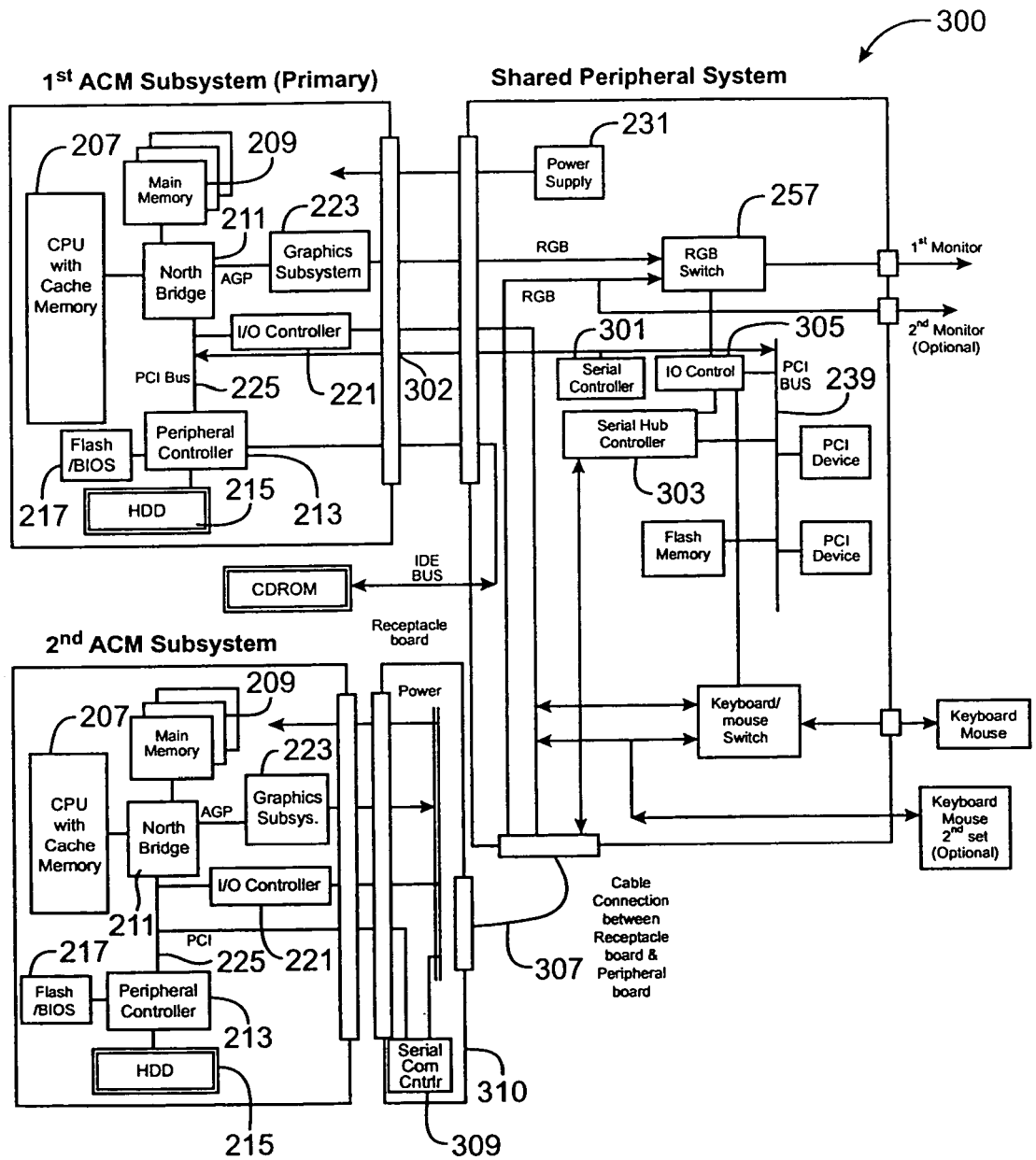
FIG. 3 is a simplified block diagram of a compeer system according to a further alternative embodiment of the present invention.

FIG. 3 is a simplified block diagram 300 of a computer system according to an alternative embodiment of the present invention. This diagram is merely an example which should not limit the scope of the claims herein. One of ordinary skill in the art would recognizes many other variations, modifications, and alternatives. Like reference numerals are used in this Fig. as the previous Figs. for easy referencing, but are not intended to be limiting. As shown, each ACM includes common elements as the previous Fig. A primary ACM 203 is connected to PCI peripheral devices in the peripheral console through the PCI bus 225 that passes through the connection between primary ACM 203 and peripheral console 201. As shown, ACM has a CPU module 207 coupled to the PCI bus through a North Bridge 211.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, peripheral controller 213 is coupled to BIOS/flash memory 217. Additionally, the peripheral controller is coupled to a clock control logic, a configuration signal, and a peripheral bus. The ACM has the hard drive module 215. Among other elements, the ACM includes north bridge 215, graphics subsystem 223 (e.g., graphics accelerator, graphics memory), an IDE controller, and other components. Adjacent to and in parallel alignment with the hard drive module 215 is the PCI bus. In a specific embodiment, North Bridge unit 211 often couples to a computer memory 209, to the graphics subsystem, and to the peripheral controller via the PCI bus. Graphics subsystem typically couples to a graphics memory, and other elements. IDE controller generally supports and provides timing signals necessary for the IDE bus. In the present embodiment, the IDE controller is embodied as part of a P114XE controller from Intel, for example. Other types of buses than IDE are contemplated, for example EIDE, SCSI, 1394, and the like in alternative embodiments of the present invention.

The hard drive module or mass storage unit 215 typically includes a computer operating system, application software program files, data files, and the like. In a specific embodiment, the computer operating system may be the Windows98 operating system from Microsoft Corporation of Redmond Wash. Other operating systems, such as Windows$^{NT}$, MacOS8, Unix, and the like are also contemplated in alternative embodiments of the present invention. Further, some typical application software programs can include Office98 by Microsoft Corporation, Corel Perfect Suite by Corel, and others. Hard disk module 215 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE. Among other features, the computer system includes an ACM with security protection.

The ACM also has a network controller, which can be coupled to a serial port 302, which is coupled to the PCI bus in the ACM. The serial port is coupled to the peripheral console through a serial controller 301 in the serial console. The serial controller is connected to PCI bus 239. The serial controller is also coupled to a serial hub controller 303, which is coupled to the PCI bus and a second ACM. In a specific embodiment, a receptacle board 310 is added to connect to the second ACM. The purpose of the receptacle board is to allow a cable connection 307 to the peripheral board 300. The cable connection is possible because the signals needed to connect to the peripheral board can be limited to video, I/O, serial communication, and power. The serial communication controller can be placed on the receptacle board and not in the ACM. As shown, the serial bus controller couples to the PCI bus. The receptacle board also couples to power, graphics subsystem, I/O controller, and other elements, which may be on a common bus. The overall operation of the present configuration is similar to the previous one except it operates in serial communication mode.

The Dual ACM system can support different usage models:

1. One user using both ACMs concurrently with 1 or 2 monitors, and a common keyboard/mouse.

2. Two users using the two separate ACMs at the same time with separate monitors and keyboard/mouse. The 2 users share peripherals, e.g., printer, CDROM, and others. The two users share external networking.

To support 1 monitor for both ACMs, a video switch in the peripheral console is used to switch between the video outputs of the two ACMs. The system can be set to support either 1 monitor or 2-monitor mode. The user presses a special key on the keyboard or a special icon on the screen to switch the screen display from one ACM to the other. This same action causes the keyboard and mouse connections to switch from one ACM to the other ACM.

A dual ACM system can save space, wiring, and cost for a 2-person PC setup, with the added benefit that both PC systems can be accessed from one user site for increased system performance if the other user is not using the system. Files can be copied between the primary drive of both system and provides protection against a single ACM failure. Software needs to be developed to manage the concurrent use of two PC subsystems, the automatic sharing of selected files between the two systems, and fault tolerance.

The design with more than two computer modules can be implemented with the use of multi-port, serial communication hub controller and multi-port I/O switches. In one embodiment, a peripheral console has four computer bays for four separate computer modules. The computer modules communicate through a four port Ethernet hub. The video, keyboard, and mouse switch will cycle through the connection from each computer module to the external monitor, keyboard, and mouse with a push button sequentially. This embodiment is useful for a server that performs different functions concurrently, e.g. email, application hosting, web hosting, firewall, etc.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 4:
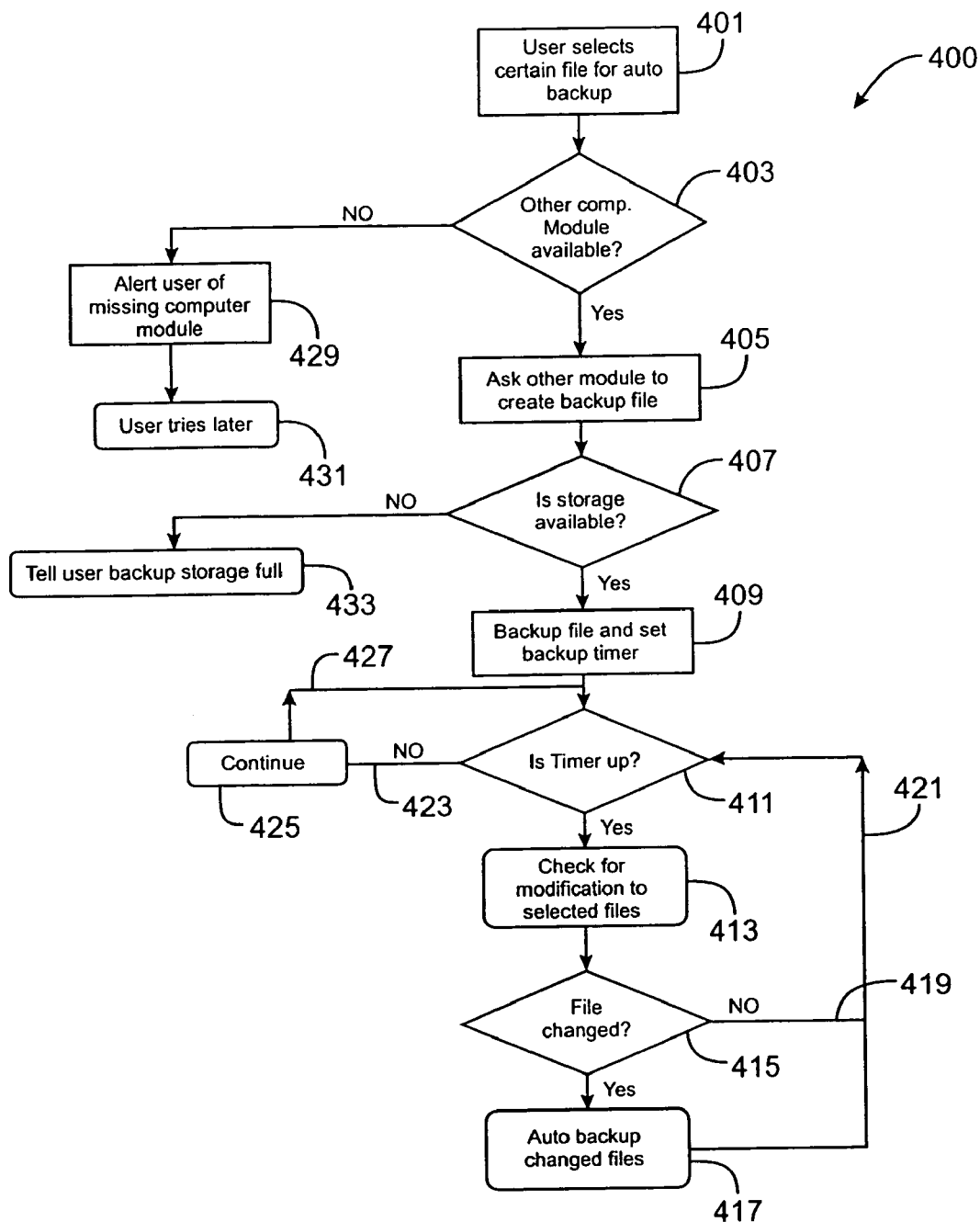
FIG. 4 is a simplified flow diagram of a method according to an embodiment of the present invention.

FIG. 4 is a simplified diagram of a method according to an embodiment of the present invention. This diagram is merely an example which should not limit the scope of the claims herein. One of ordinary skill in the art would recognize many other variations, modifications, and alternatives. The present diagram illustrates an automatic file backup procedure from one computer module to the other. As shown, a user selects (step 401) a certain file in one of the computer module for automatic backup. Next, the method determines if another module is available, step 403. If so, the method in the originating module requests the other computer module to create (step 405) backup file. Alternatively, the method alerts the user of the missing or malfunctioning module, step 429. The method then has the user try later 431, once the missing or malfunctioning module has been replaced or repaired. Next, the method determines if there is sufficient storage available in the other computer module for the backup files. If so, the method goes to the next step. (Alternatively, the method prompts (step 433) a message to the user indicating that the storage is full.) In the next step, the method stores the backup file in memory of the other module. After the backup file has been successfully created (step 409), the software in the originating ACM sets a timer to check (step 411) for file modification via branches 423, 427 through continue, step 425 process. If a file selected for backup has been modified (step 415), then the file is automatically back up to the other ACM again, step 417. Alternatively, the method returns to step 411 through branch 421.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A computer system comprising:
   a console comprising a first coupling site, a second coupling site, and a power supply, each coupling site comprising a connector, the console being an enclosure that is capable of housing each coupling site;
   a plurality of computer modules, each coupled to the connector and comprising,
      a processing unit configured to operate at a frequency of 400 MHz or higher for high speed serial communication with the other modules,
      a main memory coupled to the processing unit, and
      a mass storage device coupled to the processing unit; and
   a peripheral system housed within the console and shared between the plurality of computer modules,
   wherein each of the computer modules is substantially similar in design to each other to provide independent processing of each of the computer modules in the computer system, wherein each of the computer modules and the peripheral system receives DC power from the power supply in the console, and wherein any two of the computer modules can replace each other in operation.

2. The computer system of claim 1 wherein the peripheral system comprises at least one device selected from the group consisting of an input device, a second input device, a first monitor, a second monitor, a CDROM, and an external communication port.

3. The computer system of claim 1 wherein an Ethernet controller is utilized for communication between the computer modules to access the shared peripheral system.

4. The computer system of claim 1 wherein each computer module comprises a second enclosure.

5. The peripheral system of claim 2 wherein the peripheral device is used to control any one of the computer modules of claim 1.

6. The computer system of claim 4 wherein the console further comprises a serial communication controller adapted to transfer data between any two of the computer modules.

7. The computer system of claim 6 wherein direct communication between any two of the computer modules adapted within the console is primarily through serial communication.

8. A computer system comprising:
a console comprising a first coupling site, a second coupling site, and a serial communication controller, each coupling site comprising a connector, the console comprising an enclosure capable of housing each coupling site; and
a plurality of computer modules mated with said console through the connector, each comprising,
a processing unit configured to operate at a frequency of 400 MHz or higher for high speed serial communication with the other modules,
a network controller coupled to the processing unit, and
a mass storage device coupled to the processing unit,
wherein each of the computer units is substantially similar in design to each other to provide independent processing of each of the computer modules in the computer system, wherein each of the computer modules communicates with each other and to an external network through the serial communication controller in the console, and wherein any two computer modules can replace each other in operation.

9. The computer system of claim 8 wherein the console further comprises a power supply that supplies power to the serial communication controller.

10. The computer system of claim 8 wherein the serial communication controller supports Giga-bit Ethernet network communication.

11. The computer system of claim 8 wherein the network controller in each of the computer modules supports Giga-bit Ethernet network communication.

12. The computer system of claim 8 wherein each computer module comprises a second enclosure.

13. The computer system of claim 12 wherein each computer module comprises a second enclosure.

14. The computer system of claim 12 wherein the console further comprises a serial communication controller adapted to transfer data between any two of the computer modules.

15. The computer system of claim 14 wherein direct communication between any two of the computer modules adapted within the console is primarily through serial communication.

16. The computer system of claim 13 wherein the serial communication controller supports Giga-bit Ethernet communication between computer modules and connects to an external network.

17. A computer system comprising:
a console comprising a first coupling site, a second coupling site, a serial communication controller, and a power supply, each coupling site comprising a connector, the console being an enclosure that is capable of housing each coupling site and the power supply; and
a plurality of computer modules, each coupled to the connector and comprising,
a processing unit configured to operate at a frequency of 400 MHz or higher,
a network controller configured to support Giga-bit Ethernet network communication with the other modules,
a main memory coupled to the processing unit, and
a mass storage device coupled to the processing unit,
wherein each of the computer modules is substantially similar in design to each other to provide independent processing of each of the computer modules in the computer system, wherein each of the computer modules receives DC power from the power supply in the console, and wherein any two of the computer modules can replace each other in operation.

18. The computer system of claim 17 wherein each computer module comprises a second enclosure.

19. A computer system comprising:
a shared peripheral console comprising a first coupling site, a second coupling site, a serial communication controller and a power supply, each coupling site comprising a connector, the console being an enclosure that is capable of housing each coupling site; and
a plurality of computer modules, each coupled to the connector and comprising,
a processing unit configured to operate at a frequency of 400 MHz or higher,
an Ethernet network controller configured to allow high speed serial communication with the other modules,
a main memory coupled to the processing unit, a mass storage device coupled to the processing unit, and
stored graphic control software code for performing a control function,
wherein each of the computer modules is substantially similar in design to each other to provide independent processing of each of the computer modules in the computer system, wherein each of the computer modules receives DC power from the power supply in the console, and wherein any two of the computer modules can replace each other in operation.

20. The computer system of claim 19 wherein the serial communication controller supports Giga-bit Ethernet communication between computer modules and connects to an external network.

21. The computer system of claim 19 wherein each computer module comprises a second enclosure.

22. A computer system comprising:
a console comprising a first coupling site, a second coupling site, a serial communication controller, and a power supply, each coupling site comprising a connector, the console comprising an enclosure capable of housing each coupling site and the power supply;
a plurality of computer modules, each coupled to the connector and comprising,
a processing unit configured to operate at a frequency of 400 MHz or higher,
a network controller coupled to the processor to allow high speed serial communication with the other modules,
a main memory coupled to the processing unit, a mass storage device coupled to the processing unit, and keyboard and mouse input data processing software; and module keyboard and mouse switch software switching an external keyboard, and mouse to couple to each of the computer modules, wherein each of the computer modules is substantially similar in design to each other to provide independent processing of each of the computer modules in the computer system, wherein each of the computer modules receive DC power from the power supply in the console, and wherein any two of the computer modules can replace each other in operation.

23. The computer system of claim 22 wherein the serial communication controller supports Giga-bit Ethernet communication between computer modules and connects to an external network.

24. The computer system of claim 22 wherein each computer module comprises a second enclosure.

25. A computer system comprising:

a console comprising a first coupling site, a second coupling site, and a serial communication hub controller, each coupling site comprising a connector, the console being an enclosure that is capable of housing each coupling site and said serial communication hub controller; and a plurality of computer modules mated with said console, each coupled to the connector and comprising,
 a processing unit,
 a main memory coupled to the processing unit,
 a hard disk drive coupled to the processing unit, and
 a serial communication controller coupled to said serial communication hub controller serving as the primary high speed direct communication with the other computer modules within the console, wherein each of the computer modules is substantially similar in design to each other to provide independent processing of each of the computer modules in the computer system.

26. The computer system of claim 25 wherein the console further comprises video, keyboard and mouse switch circuits coupled to the serial communication hub controller.

27. A computer system for multi-processing purposes, the computer system comprising:

a console comprising a first coupling site and a second coupling site; each coupling site comprising a connector, the console being an enclosure that is capable of housing each coupling site;

a plurality of computer modules mated with said console, each of the computer modules enclosed within a housing and coupled to the connector, each of the computer modules comprising a processing unit, a main memory coupled to the processing unit, a graphics controller coupled to the processing unit, and a mass storage device comprising a hard disk drive coupled to the processing unit;

wherein each of the computer modules is substantially similar in design to each other to provide independent processing of each of the computer modules in the computer system, and wherein one of the plurality of computer modules is configured to provide protection against failure of another of the plurality of computer modules.

28. The computer system of claim 27 wherein the console further comprises a serial communication controller adapted to transfer data between any two of the computer modules.

29. The computer system of claim 27 wherein the console further comprises at least one of:

video, keyboard, and mouse switch software; and video, keyboard and mouse switch circuits.

30. The computer system of claim 28 wherein direct communication between any two of the computer modules adapted within the console is primarily through serial communication.

31. The computer system of claim 28 wherein the serial communication controller supports Giga-bit Ethernet communication between computer modules and connects to an external network.

32. The computer system of claim 29 further comprising at least one of a special key on a keyboard and a special screen icon, the special key and the icon configured to allow the user to switch a screen display from one computer module to another computer module.

33. A computer system for multi-processing purposes, the computer system comprising:

a console comprising a first coupling site and a second coupling site; each coupling site comprising a connector, the console being an enclosure that is capable of housing each coupling site;

a plurality of computer modules mated with said console, each of the computer modules coupled to the connector, each of the computer modules comprising a processing unit, a main memory coupled to the processing unit, a graphics controller coupled to the processing unit, and a mass storage device coupled to the processing unit; and a serial communication hub controller housed within the console and adapted to transfer data between any two of the computer modules, wherein each of the computer modules is substantially similar in design to each other to provide independent processing of each of the computer modules in the computer system.

34. The computer system of claim 33 wherein the console further comprises a power supply that supplies power to the serial communication hub controller.

35. The computer system of claim 33 wherein the serial communication hub controller supports Ethernet network communication.

36. The computer system of claim 33 wherein the serial communication hub controller supports Giga-bit Ethernet network communication.

37. The computer system of claim 33 wherein each of the computer modules further comprises a network controller configured to support Giga-bit Ethernet network communication.

38. The computer system of claim 33 further comprising at least one of a special key on a keyboard and a special screen icon, the special key and the icon configured to allow the user to switch a screen display from one computer module to another computer module.

39. The computer system of claim 33 wherein the console further comprises at least one of:

video, keyboard, and mouse switch software; and video, keyboard and mouse switch circuits coupled to the serial communication hub controller.

40. The computer system of claim 39 further comprising at least one of a special key on a keyboard and a special screen icon, the special key and the icon configured to allow the user to switch a screen display from one computer module to another computer module.

41. A computer system comprising:
a console comprising a first coupling site, a second coupling site, an Ethernet communication controller, each coupling site comprising a connector, the console being an enclosure that is capable of housing each coupling site and the Ethernet communication controller; and
a plurality of computer modules mated with said console, each coupled to one of the connectors in the console and comprising,
a processing unit configured to operate at a frequency of 400 MHz or higher,
a network controller coupled to the Ethernet communication controller and configured to support communication with the other modules,
a main memory coupled to the processing unit, and
a mass storage device coupled to the processing unit,
wherein each of the computer modules provide independent processing in the computer system, and wherein one of the computer modules is configured to provide protection against failure of another of the plurality of computer modules.

42. The computer system of claim 41 wherein the Ethernet communication controller supports Giga-bit Ethernet communication between the computer modules and to an external network.

43. The computer system of claim 41 wherein the console further comprises a peripheral system shared between the plurality of computer modules, and wherein the peripheral system comprises at least one device selected from the group consisting of an input device, a second input device, a first monitor, a second monitor, a CDROM, and an external communication port.

44. The computer system of claim 41 wherein communication between the computer modules is through Ethernet communication.

45. The computer system of claim 41 wherein Ethernet communication between the computer modules passes through said connectors.

46. A computer system comprising:
a console comprising a first coupling site, a second coupling site, a serial communication hub controller, each coupling site comprising a connector, the console being an enclosure that is capable of housing each coupling site and the serial communication hub controller; and
a plurality of computer modules mated with said console, each coupled to one of the connectors of the console and comprising,
a processing unit configured to operate at a frequency of 400 MHz or higher,
a network controller configured to support communication with the other modules,
a main memory coupled to the processing unit, and
a graphics controller coupled to the processing unit,
wherein each of the computer modules provide independent processing in the computer system, and wherein one of the computer modules is configured to provide protection against failure of another of the plurality of computer modules.

47. The computer system of claim 46 wherein the serial communication hub controller supports Giga-bit Ethernet communication between the computer modules and to an external network.

48. The computer system of claim 46 wherein the console further comprises a peripheral system shared between the plurality of computer modules and wherein the peripheral system comprises at least one device selected from the group consisting of an input device, a second input device, a first monitor, a second monitor, a CDROM, and an external communication port.

49. The computer system of claim 46 wherein communication between the computer modules is through serial communication.

50. The computer system of claim 46 wherein serial communication between the computer modules passes through said connectors.

51. A computer system comprising:
a console comprising a first coupling site, a second coupling site, an Ethernet communication hub controller, each coupling site comprising a connector, the console being an enclosure that is capable of housing each coupling site and the Ethernet communication hub controller; and
a plurality of computer modules mated with said console, each coupled to one of the connectors of the console and comprising,
a processing unit configured to operate at a frequency of 400 MHz or higher,
a network controller coupled to the Ethernet communication hub controller configured to support communication with the other modules,
a main memory coupled to the processing unit, and
a mass storage device coupled to the processing unit,
wherein each of the computer modules provide independent processing in the computer system, and wherein two of the computer modules can replace each other in operation.

52. The computer system of claim 51 wherein the Ethernet communication hub controller supports Giga-bit Ethernet communication between the computer modules and to an external network.

53. The computer system of claim 51 wherein the console further comprises a peripheral system shared between the plurality of computer modules, and wherein the peripheral system comprises at least one device selected from the group consisting of an input device, a second input device, a first monitor, a second monitor, a CDROM, and an external communication port.

54. The computer system of claim 51 wherein communication between the computer modules is through Ethernet communication.

55. The computer system of claim 51 wherein Ethernet communication between the computer modules passes through said connectors.

56. A computer system comprising:
a console comprising a first coupling site, a second coupling site, a serial communication controller, each coupling site comprising a connector, the console being an enclosure that is capable of housing each coupling site and the serial communication controller; and
a plurality of computer modules mated with said console, each coupled to one of the connectors of the console and comprising,
a processing unit configured to operate at a frequency of 400 MHz or higher;
a network controller configured to support communication with the other modules,
a main memory coupled to the processing unit, and
a graphics controller coupled to the processing unit,
wherein each of the computer modules provide independent processing in the computer system, and wherein two of the computer modules can replace each other in operation.

57. The computer system of claim 56 wherein the serial communication controller supports Giga-bit Ethernet communication between the computer modules and to an external network.

58. The computer system of claim 56 wherein the console further comprises a peripheral system shared between the plurality of computer modules, and wherein the peripheral system comprises at least one device selected from the group consisting of an input device, a second input device, a first monitor, a second monitor, a CDROM, and an external communication port.

59. The computer system of claim 56 wherein communication between the computer modules is through serial communication.

60. The computer system of claim 56 wherein serial communication between computer modules passes through said connectors.

61. A computer system comprising:
a console comprising a first coupling site, and a second coupling site, each coupling site comprising a connector and a slot, the console being an enclosure housing each coupling site, an Ethernet hub controller, and a plurality of computer modules, each coupled to one of the coupling sites through the connector and the slot;
each computer module comprising a processing unit, a main memory coupled to the processing unit, a graphics controller coupled to the processing unit, and
an Ethernet controller coupled to the Ethernet hub controller through the connector of the coupling site for communication between the computer modules;
wherein each of the computer modules operates fully independent of each other, and wherein any one of the computer modules can replace another computer module in operation.

62. The computer system of claim 61 wherein the console further houses a power supply that supplies DC power to the Ethernet hub controller and the computer modules.

63. The computer system of claim 61 wherein the computer module further comprises of an enclosure and a hard disk drive wherein the enclosure houses the hard disk drive.

64. The computer system of claim 61 wherein the Ethernet controller of each computer module and the Ethernet hub controller provide Gbit Ethernet communication.

65. The computer system of claim 61 wherein the console further houses a keyboard/mouse multi-port switch for switching between keyboard/mouse connection of the computer modules.

66. A computer system comprising:
a console comprising a power supply, a first coupling site, and a second coupling site, each coupling site comprising a connector and a slot, the console being an enclosure housing each coupling site, a serial communication hub controller powered by the power supply, and a plurality of computer modules;
each computer module coupled to one of the coupling sites through the connector and the slot;
each computer module comprising a processing unit, a main memory coupled to the processing unit, a graphics controller coupled to the processing unit, and a serial communication controller coupled to the serial communication hub controller through the connector of the coupling site for communication between the computer modules;
wherein each of the computer modules operates fully independent of each other, and wherein one of the computer modules can provide protection against failure of any one of the other computer modules.

67. The computer system of claim 66 wherein the console further houses a video switch coupled to the graphics controller of each of the computer modules.

68. The computer system of claim 66 wherein the computer module further comprises of an enclosure and a hard disk drive wherein the enclosure houses the hard disk drive.

69. The computer system of claim 66 wherein the serial communication hub controller comprises an Ethernet hub controller adapted to transfer data between any two of the computer modules and to an external network.

70. The computer system of claim 66 wherein each computer module further comprises of keyboard/mouse switching software to connect to an external keyboard/mouse through network.

71. A computer system comprising:
a console comprising a video switch, a first coupling site, and a second coupling site, each coupling site comprising a connector and a slot, the console being an enclosure housing the video switch, each coupling site, an Ethernet controller coupled to an external network, and a plurality of computer modules, each coupled to one of the coupling sites through the connector and the slot;
each computer module comprising a processing unit, a main memory coupled to the processing unit, a graphics controller coupled to the video switch, and a network controller coupled to the Ethernet controller through the connector of the coupling site for communication between the computer modules;
wherein each of the computer modules operates fully independent of each other.

72. The computer system of claim 71 wherein the console further houses a power supply that supplies DC power to the Ethernet controller.

73. The computer system of claim 71 wherein the computer module further comprises of an enclosure and a hard disk drive wherein the enclosure houses the hard disk drive.

74. The computer system of claim 71 wherein the network controller of each computer module and the Ethernet controller provide Gbit Ethernet communication.

75. The computer system of claim 71 wherein the console further houses a keyboard/mouse multi-port switch for switching between keyboard/mouse connection of the computer modules.

76. A computer system comprising:
a console comprising a power supply, a first coupling site, and a second coupling site, each coupling site comprising a connector and a slot, the console being an enclosure housing each coupling site, an Ethernet hub controller powered by the power supply, and a plurality of computer modules; each of the computer module coupled to one of the coupling sites through the connector and the slot;
each computer module comprising a processing unit, a main memory coupled to the processing unit, a SCSI hard disk drive, and an Ethernet controller coupled to the Ethernet hub controller through the connector of the coupling site for communication between the computer modules;
wherein each of the computer modules operates fully independent of each other, and wherein any one of the computer modules can replace another computer module in operation.

77. The computer system of claim 76 wherein the console further comprises a video switch coupled to the computer module.

78. The computer system of claim 76 wherein the SCSI hard disk drive is removable while the computer module is in operation.

79. The computer system of claim 76 wherein the Ethernet controller of each computer module and the Ethernet hub controller provide Gbit Ethernet communication.

80. The computer system of claim 76 wherein the console further comprises of a keyboard/mouse switch coupled to the computer module.

81. A computer system comprising:
a console comprising a first coupling site, and a second coupling site, each coupling site comprising a connector and a slot; the console being an enclosure housing each coupling site, an Ethernet hub controller, and a plurality of computer modules, each coupled to the coupling site through the connector and the slot;
each computer module comprising a processing unit, a main memory coupled to the processing unit, a graphics controller, and an Ethernet controller coupled to the Ethernet hub controller through the connector of the coupling site for communication between the computer modules; and
a SCSI hard disk drive coupled to the computer module;
wherein each of the computer modules is substantially similar in design to each other, and wherein one of the computer modules can provide protection against failure of another one of the computer modules.

82. The computer system of claim 81 wherein the console further houses a power supply that supplies DC power to the Ethernet hub controller and the computer modules.

83. The computer system of claim 81 wherein the hard disk drive is removable.

84. The computer system of claim 81 wherein the Ethernet controller of each computer module and the Ethernet hub controller provide Gbit Ethernet communication.

85. The computer system of claim 81 wherein the console further comprises of a keyboard/mouse switch and a video switch coupled to the computer module.

86. A computer system comprising:
a console comprising an Ethernet communication controller coupled to an external network, a keyboard/mouse multi-port switch, a first coupling site, and a second coupling site, each coupling site comprising a connector and a slot, the console being an enclosure housing the Ethernet communication controller, each coupling site, and
a plurality of computer modules, each coupled to one of the coupling sites through the connector and the slot;
each computer module comprising an enclosure, a processing unit, a main memory coupled to the processing unit, and a network controller coupled to the Ethernet communication controller through the connector of the coupling site for communication between the computer modules;
wherein each of the computer modules operates fully independent of each other; and wherein the keyboard/mouse multi-port switch switches between keyboard/mouse connection of the computer modules based on a command from a user.

87. The computer system of claim 86 wherein the console further houses a power supply that supplies DC power to the Ethernet communication controller and the computer modules.

88. The computer system of claim 86 wherein the network controller of each computer module and the Ethernet communication controller provide Gbit Ethernet communication.

89. The computer system of claim 86 wherein the command from the user is in the form of either a key on the keyboard or an icon on the screen that the mouse can click on.

90. A computer system comprising:
a console comprising a power supply, a first coupling site, and a second coupling site, each coupling site comprising a connector and a slot, the console being an enclosure housing the power supply, each coupling site, an Ethernet controller coupled to an external network and powered by the power supply, and a plurality of computer modules, each coupled to one of the coupling sites through the connector and the slot;
each computer module comprising a processing unit, a main memory coupled to the processing unit, and a network controller coupled to the Ethernet controller through the connector of the coupling site for communication between the computer modules;
wherein each of the computer modules operates fully independent of each other.

91. The computer system of claim 86 wherein the computer module further comprises of an enclosure and a hard disk drive wherein the enclosure houses the hard disk drive.

* * * * *

(12) INTER PARTES REEXAMINATION CERTIFICATE (806th)
United States Patent
Chu

(10) Number: US 7,099,981 C1
(45) Certificate Issued: Jan. 23, 2014

(54) MULTIPLE MODULE COMPUTER SYSTEM AND METHOD

(75) Inventor: William W. Y. Chu, Los Altos, CA (US)

(73) Assignee: ACQIS LLC, McKinney, TX (US)

Reexamination Request:
No. 95/001,310, Feb. 9, 2010

Reexamination Certificate for:
Patent No.: 7,099,981
Issued: Aug. 29, 2006
Appl. No.: 10/772,214
Filed: Feb. 3, 2004

Related U.S. Application Data

(63) Continuation of application No. 09/569,758, filed on May 12, 2000, now Pat. No. 6,718,415.

(60) Provisional application No. 60/134,122, filed on May 14, 1999.

(51) Int. Cl.
*G06F 1/00* (2006.01)

(52) U.S. Cl.
USPC ........... 710/301; 709/227; 709/248; 710/313; 710/315; 710/63; 710/72

(58) Field of Classification Search
USPC ........................................... 710/301
See application file for complete search history.

(56) References Cited

To view the complete listing of prior art documents cited during the proceeding for Reexamination Control Number 95/001,310, please refer to the USPTO's public Patent Application Information Retrieval (PAIR) system under the Display References tab.

*Primary Examiner* — Majid A. Banankhah

(57) ABSTRACT

A computer system for multi-processing purposes. The computer system has a console comprising a first coupling site and a second coupling site. Each coupling site comprises a connector. The console is an enclosure that is capable of housing each coupling site. The system also has a plurality of computer modules, where each of the computer modules is coupled to a connector. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

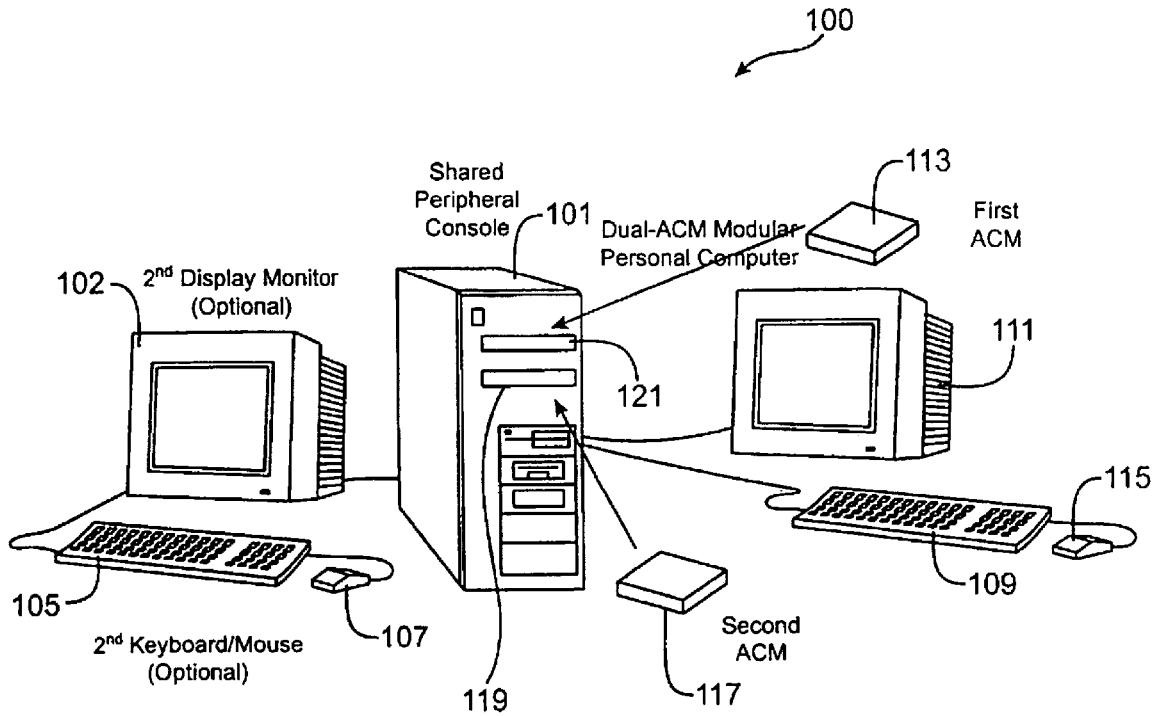

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-91 are cancelled.

\* \* \* \* \*